(12) United States Patent
Yuan et al.

(10) Patent No.: US 12,517,646 B2
(45) Date of Patent: Jan. 6, 2026

(54) TEXT INPUT METHOD AND APPARATUS BASED ON VIRTUAL KEYBOARD

(71) Applicant: Huawei Technologies Co., Ltd., Guangdong (CN)

(72) Inventors: Jiajie Yuan, Beijing (CN); Siwei Liu, Beijing (CN); Menghan Zhang, Beijing (CN); Haitao Wang, Beijing (CN); Peng Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 55 days.

(21) Appl. No.: 18/174,099

(22) Filed: Feb. 24, 2023

(65) Prior Publication Data

US 2023/0195301 A1 Jun. 22, 2023

Related U.S. Application Data

(63) Continuation of application No. PCT/CN2021/113839, filed on Aug. 20, 2021.

(30) Foreign Application Priority Data

Aug. 26, 2020 (CN) .......................... 202010874085.1

(51) Int. Cl.
*G06F 3/0487* (2013.01)
*G06F 3/01* (2006.01)
(52) U.S. Cl.
CPC ............ *G06F 3/0487* (2013.01); *G06F 3/011* (2013.01); *G06F 3/017* (2013.01)
(58) Field of Classification Search
None
See application file for complete search history.

(56) References Cited

U.S. PATENT DOCUMENTS

| 5,767,842 A | 6/1998 | Korth | |
| 6,771,294 B1 * | 8/2004 | Pulli | ....................... G06F 3/011 |
| | | | 715/764 |

(Continued)

FOREIGN PATENT DOCUMENTS

| CN | 104461004 A | 3/2015 |
| CN | 106095309 A | 11/2016 |

(Continued)

OTHER PUBLICATIONS

Wang, Cheng-Yao, Wei-Chen Chu, Po-Tsung Chiu, Min-Chieh Hsiu, Yih-Harn Chiang, and Mike Y. Chen. "PalmType: Using palms as keyboards for smart glasses." In Proceedings of the 17th International Conference on Human-Computer Interaction with Mobile Devices and Services, pp. 153-160. 2015. (Year: 2015).*

(Continued)

*Primary Examiner* — Mandrita Brahmachari
(74) *Attorney, Agent, or Firm* — WOMBLE BOND DICKINSON (US) LLP

(57) ABSTRACT

A text input method and apparatus based on a virtual keyboard are provided, which relate to the field of human-computer interaction, and resolve a problem of how to complete text input based on the virtual keyboard. The method includes an electronic device that detects key points of a first hand based on an image including the first hand after obtaining the image including the first hand, and projects a virtual keyboard on the first hand based on the key points of the first hand. Further, after obtaining an image including the first hand and a finger of a second hand, the electronic device identifies, based on the image including the first hand and the finger of the second hand, a contact state or a pressing state between the finger of the second hand and the first hand.

20 Claims, 14 Drawing Sheets

(56) References Cited

U.S. PATENT DOCUMENTS

| | | | |
|---|---|---|---|
| 8,228,315 B1* | 7/2012 | Starner | G06F 3/0304 |
| | | | 345/175 |
| 9,030,425 B2 | 5/2015 | Stafford | |
| 10,288,419 B2 | 5/2019 | Abovitz et al. | |
| 2009/0295712 A1* | 12/2009 | Ritzau | H04M 1/72409 |
| | | | 345/156 |
| 2011/0214082 A1* | 9/2011 | Osterhout | G02B 27/017 |
| | | | 715/773 |
| 2013/0241890 A1* | 9/2013 | Sharma | G06F 3/0426 |
| | | | 345/175 |
| 2013/0257751 A1* | 10/2013 | Stafford | G06F 3/011 |
| | | | 345/173 |
| 2015/0160785 A1* | 6/2015 | Wang | G06F 18/24323 |
| | | | 345/175 |
| 2015/0323998 A1 | 11/2015 | Kudekar et al. | |
| 2016/0282951 A1* | 9/2016 | Hwang | G06F 3/0304 |
| 2017/0090747 A1* | 3/2017 | Dash | G06F 1/163 |
| 2019/0034765 A1* | 1/2019 | Kaehler | G06F 18/2148 |
| 2019/0102044 A1 | 4/2019 | Wang et al. | |
| 2019/0121522 A1* | 4/2019 | Davis | G06V 40/28 |
| 2019/0138082 A1* | 5/2019 | Greenberger | G06V 10/141 |
| 2019/0141181 A1* | 5/2019 | Wantland | G06F 1/1626 |
| 2020/0125176 A1* | 4/2020 | Chou | G06V 40/28 |

FOREIGN PATENT DOCUMENTS

| | | |
|---|---|---|
| CN | 107633551 B | 7/2018 |
| CN | 110414393 A | 11/2019 |
| CN | 111237985 A | 6/2020 |
| JP | 2001265522 A | 9/2001 |
| JP | 2015111772 A | 6/2015 |
| JP | 2018073170 A | 5/2018 |
| WO | 2016017096 A1 | 2/2016 |
| WO | 2016121034 A1 | 8/2016 |

OTHER PUBLICATIONS

Erol et al: "Vision-based hand pose estimation: A review", Sep. 1, 2007 (Sep. 1, 2007), pp. 52-73, XP022227943.

Purnendu Mishra et al., "Fingertips Detection in Egocentric Video Frames using Deep Neural Networks",2019IEEE, total:6pages.

* cited by examiner

CONT.
FROM

1102

1101

TO

TEXT INPUT METHOD AND APPARATUS BASED ON VIRTUAL KEYBOARD

CROSS-REFERENCE TO RELATED APPLICATIONS

This application is a continuation of International Application No. PCT/CN2021/113839, filed on Aug. 20, 2021, which claims priority to Chinese Patent Application No. 202010874085.1, filed on Aug. 26, 2020. The disclosures of the aforementioned applications are hereby incorporated by reference in their entireties.

TECHNICAL FIELD

Embodiments of this application relate to the field of human-computer interaction, and in particular, to a text input method and apparatus based on a virtual keyboard.

BACKGROUND

Currently, a virtual reality (VR)/augmented reality (AR) technology has transformed to implement three-dimensional (3D) immersive display experience, and can make an interaction manner more suitable for reality. Therefore, the virtual reality/augmented reality technology has a broad application prospect in various industries, such as social networking, healthcare, education, games, and movies. For a VR/AR device, a biggest disadvantage is a text input mode. Generally, a user places, by rotating or translating a handle, ray from virtual space at a key of a virtual keyboard, and presses the handle to determine to complete input; or the user holds both hands in the air and presses the virtual keyboard to complete input. These methods are inefficient and difficult to operate; and long-time input makes the user feel sore. Therefore, how to complete text input based on the virtual keyboard is an urgent problem to be resolved.

SUMMARY

This application provides a text input method and apparatus based on a virtual keyboard, to resolve a problem of how to complete text input based on the virtual keyboard.

To achieve the foregoing objective, the following technical solutions are used in embodiments of this application.

According to a first aspect, this application provides a text input method based on a virtual keyboard. The method includes: After obtaining an image including a first hand, an electronic device detects key points of the first hand based on the image including the first hand, and projects a virtual keyboard on the first hand based on the key points of the first hand. For example, the virtual key is projected on a palm or a back of the first hand. Further, after obtaining an image including the first hand and a finger of a second hand, the electronic device identifies a contact state or a pressing state between the finger of the second hand and the first hand based on the image including the first hand and the finger of the second hand. When the finger of the second hand and the first hand are in the contact state or the pressing state, the electronic device determines input text based on a location at which the finger of the second hand touches or presses the first hand.

Therefore, the virtual keyboard is projected based on a body part (for example, a palm or back of a hand) of a user, the user does not need to excessively stare at an interface, and uses the brain to assist in positioning the projected virtual keyboard. In this way, the user can efficiently and accurately press or touch the projected virtual keyboard, and efficiency and precision of text input are effectively improved. The electronic device determines the input text by identifying a body location pressed or touched by the user. In addition, the text input method based on the virtual keyboard has no special limitation on scenarios, and the user may perform an operation in any posture. In this way, a problem such as fatigue and soreness caused by long-time suspended input of the user is resolved, sufficient physical feedback is provided, and user experience is effectively improved.

In some embodiments, that the electronic device identifies a contact state or a pressing state between the finger of the second hand and the first hand based on the image including the first hand and a finger of a second hand includes: The electronic device analyzes, by using a preset neural network model, the image including the first hand and the finger of the second hand; identifies the contact state or the pressing state between the finger of the second hand and the first hand; and obtains fingertip key points of the finger of the second hand.

In some embodiments, that the electronic device identifies a contact state or a pressing state between the finger of the second hand and the first hand based on the image including the first hand and a finger of a second hand includes: The electronic device analyzes, by using a preset neural network model, the image including the first hand and the finger of the second hand and an optical flow of the finger of the second hand; identifies the contact state or the pressing state between the finger of the second hand and the first hand; and obtains fingertip key points of the finger of the second hand. Therefore, accuracy of identifying the contact state, the pressing state, or separation between the finger of the second hand and the first hand is improved.

In some embodiments, that the electronic device determines input text based on a location at which the finger of the second hand touches or presses the first hand includes: The electronic device determines, based on fingertip coordinates of the finger of the second hand and coordinates of the virtual keyboard, the location at which the finger of the second hand touches or presses the first hand; and determines the input text based on the location at which the finger of the second hand touches or presses the first hand. A key point may be two-dimensional coordinates. Therefore, the electronic device converts a location that is pointed by a fingertip of the finger of the second hand and that is the virtual keyboard into coordinates, and determines the input text based on the coordinates. In this way, accuracy of recognizing the input text is improved.

In some embodiments, that the electronic device projects a virtual keyboard on the first hand based on the key points of the first hand includes: The electronic device identifies an action of the first hand based on a plurality of frames of images including the first hand; and determines that the action of the first hand matches a preset action, and projects the virtual keyboard based on the key points of the first hand. For example, the preset action is from clenching a first to stretching a palm. This can ensure that the electronic device identifies a location at which the virtual keyboard is projected, and accurately projects the virtual keyboard. In this way, text input of the user is facilitated.

In some embodiments, after the electronic device obtains the image including the first hand and the finger of the second hand, the method further includes: The electronic device identifies, based on the image comprising the first hand and the finger of the second hand, that the finger of the second hand and the first hand are separated; and when the finger of the second hand and the first hand are separated, obtains the image including the first hand or obtains the image including the first hand and the finger of the second hand. Therefore, the contact state, the pressing state, or separation between the finger of the second hand and the first hand is identified by positioning and tracking the image including the first hand and the finger of the second hand in real time. In this way, the input text can be accurately recognized, and user experience is improved.

In some embodiments, the method further includes: The electronic device inputs a training set into the neural network model, where the neural network model outputs a classification result; calculates a loss function value of a loss function based on the classification result, a label of a first-type training image, and a label of a second-type training image; and when the loss function converges and the loss function value is less than or equal to a threshold, obtains a parameter of the neural network model. The training set includes the first-type training image, the second-type training image, the label of the first-type training image, and the label of the second-type training image. The first-type training image includes a plurality of images in which the finger of the second hand and the first hand are in the contact state or the pressing state, the second-type training image includes a plurality of images in which the finger of the second hand and the first hand are separated, and the classification result includes a plurality of labels. Therefore, the electronic device can identify the contact state, the pressing state, and separation between the finger of the second hand and the first hand in real time.

In some embodiments, after the electronic device determines the input text based on the location at which the finger of the second hand touches or presses the first hand, the method further includes: The electronic device displays the first hand, the finger of the second hand, and the input text. Therefore, the user can intuitively view the input text in real time, and user experience is improved.

According to a second aspect, this application further provides a text input apparatus. For beneficial effect, refer to descriptions of the first aspect. Details are not described herein again. The text input apparatus has a function of implementing behavior in the method examples in the first aspect. The function may be implemented by hardware, or may be implemented by hardware executing corresponding software. The hardware or software includes one or more modules corresponding to the foregoing function. In some embodiments, the text input apparatus includes an image capture unit and a processing unit. The processing unit is configured to obtain key points of a first hand based on an image including the first hand. The processing unit is further configured to project a virtual keyboard on the first hand based on the key points of the first hand. The image capture unit is configured to obtain an image including the first hand and a finger of a second hand. The processing unit is further configured to identify a contact state or a pressing state between the finger of the second hand and the first hand based on the image including the first hand and the finger of the second hand. The processing unit is further configured to: when the finger of the second hand and the first hand are in the contact state or the pressing state, determine input text based on a location at which the finger of the second hand touches or presses the first hand. These units may perform corresponding functions in the method examples in the first aspect. For details, refer to detailed descriptions in the method examples. Details are not described herein again.

According to a third aspect, an electronic device is provided, where the electronic device may include a processor, a memory, a display, and a camera. The processor is coupled to the display, the camera, and the memory. The memory is configured to store computer program code. The computer program code includes computer software instructions. When the computer software instructions are executed by the electronic device, the electronic device performs the following operations: After obtaining an image including a first hand, the electronic device detects key points of the first hand based on the image including the first hand, and projects a virtual keyboard on the first hand based on the key points of the first hand. Further, after obtaining an image including the first hand and a finger of a second hand, the electronic device determines a contact state or a pressing state between the finger of the second hand and the first hand based on the image including the first hand and the finger of the second hand. When the finger of the second hand and the first hand are in the contact state or the pressing state, the electronic device determines input text based on a location at which the finger of the second hand touches or presses the first hand.

According to a fourth aspect, a computer-readable storage medium is provided, including computer software instructions. When the computer software instructions are run in an electronic device, the electronic device is enabled to perform the text input method based on a virtual keyboard according to some embodiments of the present disclosure.

According to a fifth aspect, a computer program product is provided. When the computer program product runs on a computer, the computer is enabled to perform the text input method based on a virtual keyboard according to some embodiments of the present disclosure.

According to a sixth aspect, a chip system is provided. The chip system is used in an electronic device. The chip system includes an interface circuit and a processor; and the interface circuit and the processor are interconnected through a line. The interface circuit is configured to receive a signal from a memory of the electronic device, and send a signal to the processor, where the signal includes computer instructions stored in the memory. When the processor executes the computer instructions, the chip system performs the text input method based on a virtual keyboard according to some embodiments of the present disclosure.

It should be understood that descriptions of technical features, technical solutions, beneficial effect, or similar words in this application do not imply that all features and advantages can be implemented in any individual embodiment. On the contrary, it may be understood that the descriptions of the features or the beneficial effect mean that at least one embodiment includes a technical feature, technical solution, or beneficial effect. Therefore, the descriptions of the technical features, the technical solutions, or the beneficial effect in this specification may not necessarily be for a same embodiment. Further, the technical features, the technical solutions, and the beneficial effect described in embodiments may be combined in any proper manner. A person skilled in the art may understand that an embodiment may be implemented without one or more technical features or technical solutions, or beneficial effect in the embodiment. In other embodiments, additional technical features and beneficial effect may be further identified in an embodiment that does not reflect all embodiments.

DESCRIPTION OF EMBODIMENTS

In this specification, the claims, and the accompanying drawings of this application, the terms "first", "second", "third", and the like are intended to distinguish between different objects but do not limit a particular order.

In embodiments of this application, the word "example", "for example", or the like is used to represent giving an example, an illustration, or a description. Any embodiment or design scheme described as an "example" or with "for example" in embodiments of this application should not be explained as being more preferred or having more advantages than another embodiment or design scheme.

An electronic device in embodiments of this application may be a television, a tablet computer, a projector, a mobile phone, a desktop computer, a laptop computer, a handheld computer, a notebook computer, an ultra-mobile personal computer (UMPC), a netbook, or a device including a display and a camera, such as a personal digital assistant (PDA), or an augmented reality (AR)/virtual reality (VR) device. A form of the electronic device is not limited in embodiments of this application.

Figure 1:
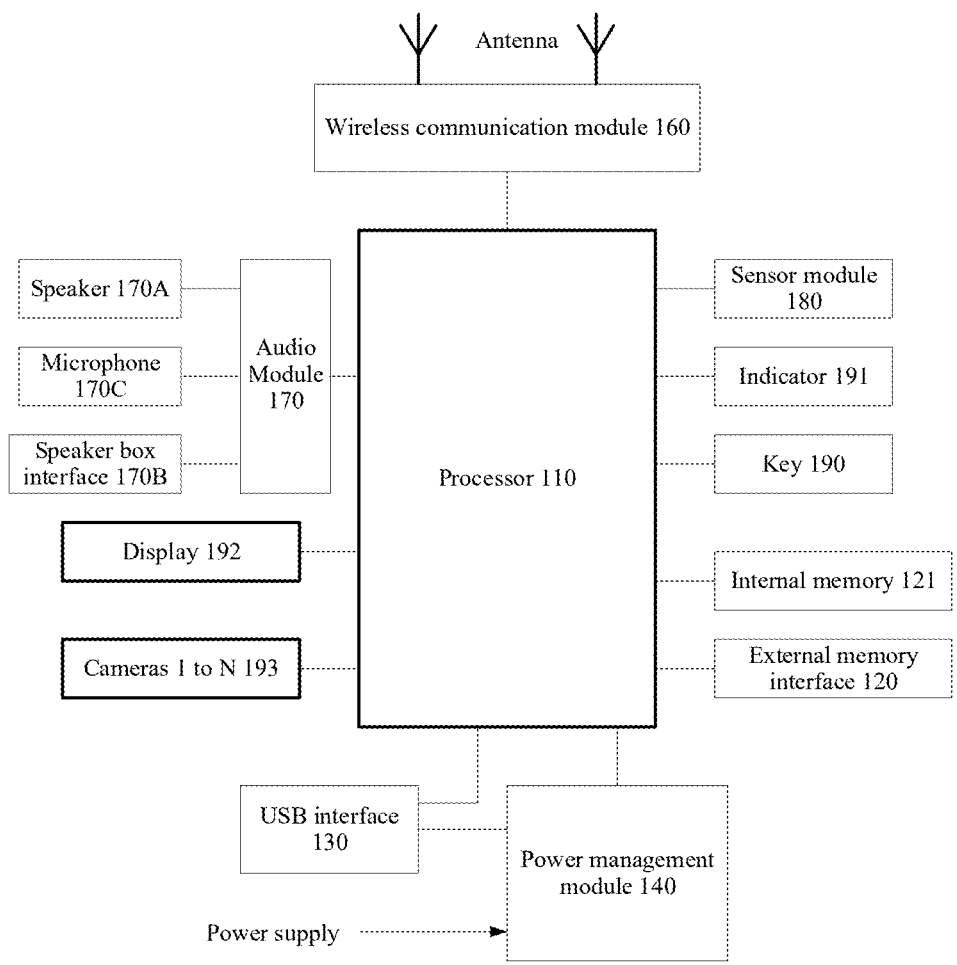
FIG. 1 is a schematic diagram of a structure of an electronic device according to an embodiment of this application.

FIG. 1 is a schematic diagram of a structure of an electronic device according to an embodiment of this application. As shown in FIG. 1, the electronic device includes: a processor 110, an external memory interface 120, an internal memory 121, a universal serial bus (USB) interface 130, a power management module 140, an antenna, a wireless communication module 160, an audio module 170, a loudspeaker 170A, a speaker box interface 170B, a microphone 170C, a sensor module 180, a key 190, an indicator 191, a display 192, a camera 193, and the like. The sensor module 180 may include a distance sensor, an optical proximity sensor, a fingerprint sensor, a temperature sensor, a touch sensor, an ambient light sensor, and the like.

It may be understood that the structure shown in this embodiment does not constitute a limitation on the electronic device. In some other embodiments, the electronic device may include more or fewer components than those shown in the figure, or combine some components, or split some components, or have different component arrangements. The components shown in the figure may be implemented through hardware, software, or a combination of software and hardware.

The processor 110 may include one or more processing units. For example, the processor 110 may include an application processor (AP), a modem processor, a graphics processing unit (GPU), an image signal processor ( ) a controller, a memory, a video codec, a digital signal processor (DSP), a baseband processor, and/or a neural-network processing unit (NPU). Different processing units may be independent components, or may be integrated into one or more processors.

In this embodiment, the processor 110 is configured to: receive an image that is from the camera 193 and that includes a first hand; obtain key points of the first hand based on the image including the first hand; and project a virtual keyboard on the first hand based on the key points of the first hand. Further, the processor 110 is configured to: receive an image that is from the camera 193 and that includes the first hand and a finger of a second hand; identify a contact state or a pressing state between the first hand and the finger of the second hand based on the image of the first finger and the finger of the second hand; and when the finger of the second hand and the first hand are in the contact state or the pressing state, determine input text based on a location at which the finger of the second hand touches or presses the first hand.

The controller may be a nerve center and a command center of the electronic device. The controller may generate an operation control signal based on an instruction operation code and a time sequence signal, to complete control of instruction reading and instruction execution.

The memory may be disposed in the processor 110, and is configured to store instructions and data. In some embodiments, the memory in the processor 110 is a cache. The memory may store instructions or data that have/has been used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a USB interface, and/or the like.

The power management module 140 is configured to connect to a power supply. The power management module 140 may be further connected to the processor 110, the internal memory 121, the display 192, the camera 193, the wireless communication module 160, and the like. The power management module 140 receives input of the power supply, to supply power to the processor 110, the internal memory 121, the display 192, the camera 193, the wireless communication module 160, and the like. In other embodiments, the power management module 140 may alternatively be disposed in the processor 110.

A wireless communication function of the electronic device may be implemented by using the antenna, the wireless communication module 160, and the like. The wireless communication module 160 may provide a wireless communication solution that is applied to the electronic device and that includes a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology.

The wireless communication module 160 may be one or more components integrating at least one communication processing module. The wireless communication module 160 receives an electromagnetic wave by the antenna, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna. In some embodiments, the antenna of the electronic device is coupled to the wireless communication module 160, so that the electronic device may communicate with a network and another device according to a wireless communication technology.

The electronic phone implements a display function by using the GPU, the display 192, the application processor, and the like. The GPU is a microprocessor used for image processing, and is connected to the display 192 and the application processor. The GPU is configured to perform mathematical and geometric calculation, and is configured to perform graphics rendering. The processor 110 may include one or more GPUs, which execute program instructions to generate or change display information.

The display 192 is configured to display an image, a video, and the like. The display 192 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like.

The electronic device may implement a photographing function by using the ISP, the camera 193, the video codec, the GPU, the display 192, the application processor, and the like. The ISP is configured to process data fed back by the camera 193. In some embodiments, the ISP may be disposed in the camera 193.

Figure 2:
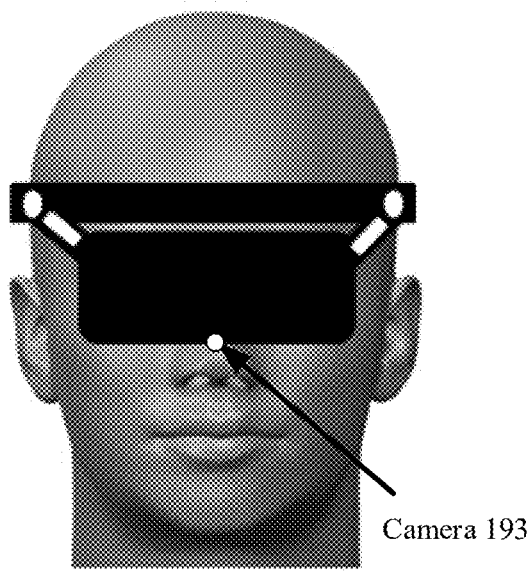
FIG. 2 is a schematic diagram of a camera of a television according to an embodiment of this application.

The camera 193 is configured to capture a static image or a video. An optical image of an object is generated through a lens and projected to a photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device may include one or N cameras 193, where N is a positive integer greater than 1. For example, a location of the camera 193 on the electronic device is not limited in this embodiment. In this embodiment, the camera 193 is configured to photograph the image including the first hand and the image including the first hand and the finger of the second hand. For example, the electronic device is a VR device. As shown in FIG. 2, the camera 193 may be disposed at a lower-side edge of the VR device. Certainly, the location of the camera 193 on the electronic device is not limited in this embodiment of this application.

Alternatively, the electronic device may not include a camera, in other words, the camera 193 is not disposed in the electronic device (for example, a television). The electronic device may be externally connected to the camera 193 through an interface (for example, the USB interface 130). The external camera 193 may be fastened to the electronic device by using an external fastener (for example, a camera bracket with a clip). For example, the external camera 193 may be fastened to an edge of the display 192 of the electronic device, for example, an upper-side edge, by using an external fastener.

The digital signal processor is configured to process a digital signal, and may process another digital signal in addition to the digital image signal. For example, when the electronic device selects a frequency, the digital signal processor is configured to perform Fourier transformation on frequency energy. The video codec is configured to compress or decompress a digital video. The electronic device may support one or more video codecs. In this way, the electronic device may play back or record videos in a plurality of coding formats, for example, moving picture experts group (MPEG)-1, MPEG-2, MPEG-3, and MPEG-4.

The NPU is a neural network (NN) computing processor. The NPU quickly processes input information by using a structure of a biological neural network, for example, by using a transfer mode between human brain neurons; and may further continuously perform self-learning. Applications such as intelligent cognition of the electronic device, such as image recognition, facial recognition, speech recognition, and text understanding, can be implemented by using the NPU.

The external memory interface 120 may be configured to connect to an external storage card, for example, a micro SD card, to extend a storage capability of the electronic device. The external storage card communicates with the processor 110 through the external memory interface 120, to implement a data storage function. For example, files such as music and videos are stored in the external storage card.

The internal memory 121 may be configured to store computer-executable program code, where the executable-program code includes instructions. The processor 110 runs the instructions stored in the internal memory 121, to perform various function applications of the electronic device and data processing. The internal memory 121 may include a program storage area and a data storage area. The program storage area may store an operating system, an application (for example, a sound playing function or an image playing function) required by at least one function, and the like. The data storage area may store data (for example, audio data) and the like created when the electronic device is used. In addition, the internal memory 121 may include a high-speed random access memory, and may further include a non-volatile memory, for example, at least one magnetic disk storage device, a flash memory device, or a universal flash storage (UFS).

The electronic device may implement an audio function by using the audio module 170, the loudspeaker 170A, the microphone 170C, the speaker box interface 170B, the application processor, and the like. For example, the audio function includes music playing, recording, and the like. In this application, the microphone 170C may be configured to receive a voice instruction sent by a user to the electronic device. The loudspeaker 170A may be configured to feed back a decision instruction of the electronic device to the user.

The audio module 170 is configured to convert digital audio information into an analog audio signal for output, and is also configured to convert analog audio input into a digital audio signal. The audio module 170 may be further configured to encode and decode audio signals. In some embodiments, the audio module 170 may be disposed in the processor 110, or some functional modules in the audio module 170 are disposed in the processor 110. The loudspeaker 170A, also referred to as a "horn", is configured to convert an audio electrical signal into a sound signal. The microphone 170C, also referred to as a "mike" or a "mic", is configured to convert a sound signal into an electrical signal.

The speaker box interface 170B is configured to connect to a wired speaker box. The speaker box interface 170B may be the USB interface 130, or may be a 3.5 mm open mobile terminal platform (OMTP) standard interface, or a cellular telecommunication industry association of the USA (CTIA) standard interface.

The key 190 includes a power-on key, a volume key, and the like. The key 190 may be a mechanical key, and may be a touch key. The electronic device may receive key input, and generate key signal input related to user settings and function control of the electronic device.

The indicator 191 may be an indicator light, and may be configured to indicate that the electronic device is in a power-on mode, a standby mode, a power-off mode, or the like. For example, if the indicator light is off, it may be indicated that the electronic device is in the power-off mode; if the indicator light is green or blue, it may be indicated that the electronic device is in the power-on mode; and if the indicator light is red, it may be indicated that the electronic device is in the standby mode.

It may be understood that the structure shown in this embodiment of this application does not constitute a limitation on the electronic device. The electronic device may have more or fewer components than those shown in FIG. 1, may combine two or more components, or may have different component configurations. For example, the electronic device may further include components such as a speaker box. Various components shown in FIG. 1 may be implemented in hardware, software, or a combination of hardware and software that includes one or more signal processing or application-specific integrated circuits.

All methods in the following embodiments may be implemented in the electronic device having the foregoing hardware structure. In the following embodiments, an example in which the electronic device is a VR device or an AR device is used to describe the method in embodiments of this application.

It is assumed that the user carries the VR device and is in a virtual environment. When the user needs to input text in the virtual environment, if the VR device photographs the image including the first hand, the VR device may detect the key points of the first hand based on the image including the first hand, and project the virtual keyboard on the first hand based on the key points of the first hand. It may be understood that the virtual keyboard is a keyboard image presented in a virtual form in the virtual environment, and is not a keyboard of a physical entity. For example, the virtual keyboard is a virtual keyboard seen by the user in the virtual environment presented by the VR device. For another example, the virtual keyboard is a virtual keyboard seen by the user in the virtual environment presented by the AR device. In this case, the user can see that the virtual keyboard is projected on the first hand in the virtual environment. Further, after obtaining the image including the first hand and the finger of the second hand, the electronic device identifies the contact state or the pressing state between the finger of the second hand and the first hand based on the image including the first hand and the finger of the second hand; and when the finger of the second hand and the first hand are in the contact state or the pressing state, determines the input text based on the location at which the finger of the second hand touches or presses the first hand. Next, with reference to FIG. 3, the text input method based on the virtual keyboard provided in embodiments is described in detail.

S301: Obtain the key points of the first hand based on the image including the first hand.

The electronic device photographs a first image by using the camera; detects, according to an object detection algorithm, the first image photographed by the camera; and determines that the first image includes the first hand. Object detection may mean finding an object of interest in an image. In some embodiments, the electronic device first selects some candidate regions on a given image, then extracts features from these regions, and classifies objects in the image by using a trained classifier based on the extracted features.

Figure 4:
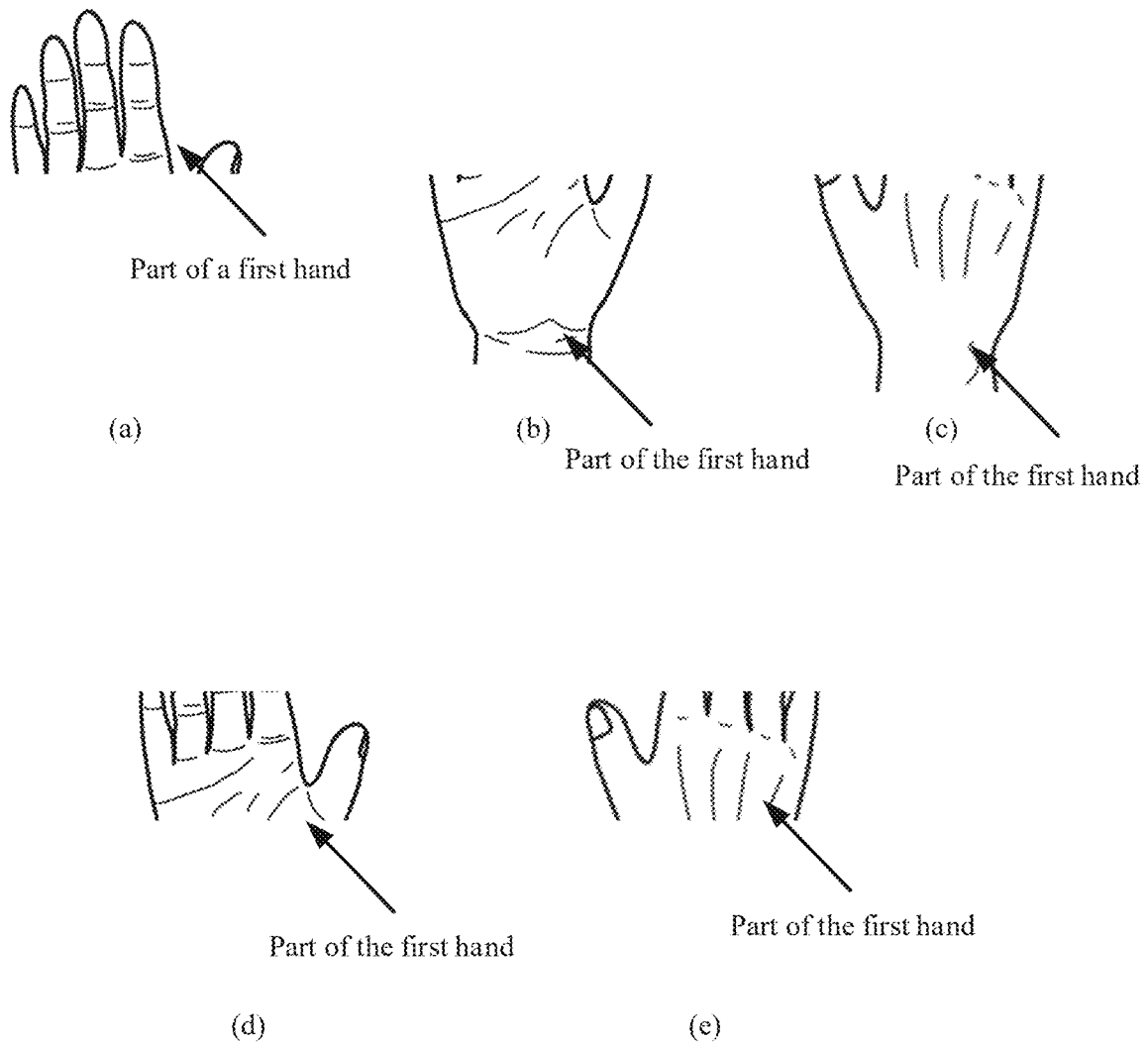
FIG. 4 is a schematic diagram of parts of a hand according to an embodiment of this application.

Further, the electronic device captures an image that includes the first hand and that is in the first image. The image including the first hand may be an image including the entire first hand, or may be an image including parts of the first hand. The parts of the first hand include but are not limited to: fingers of the first hand shown in (a) in FIG. 4, a palm of the first hand shown in (b) in FIG. 4, a back of the first hand shown in (c) in FIG. 4, a part of the fingers of the first hand and a part of the palm of the first hand shown in (d) in FIG. 4, and a part of the fingers of the first hand and a part of the back of the first hand shown in (e) in FIG. 4.

Figure 5:
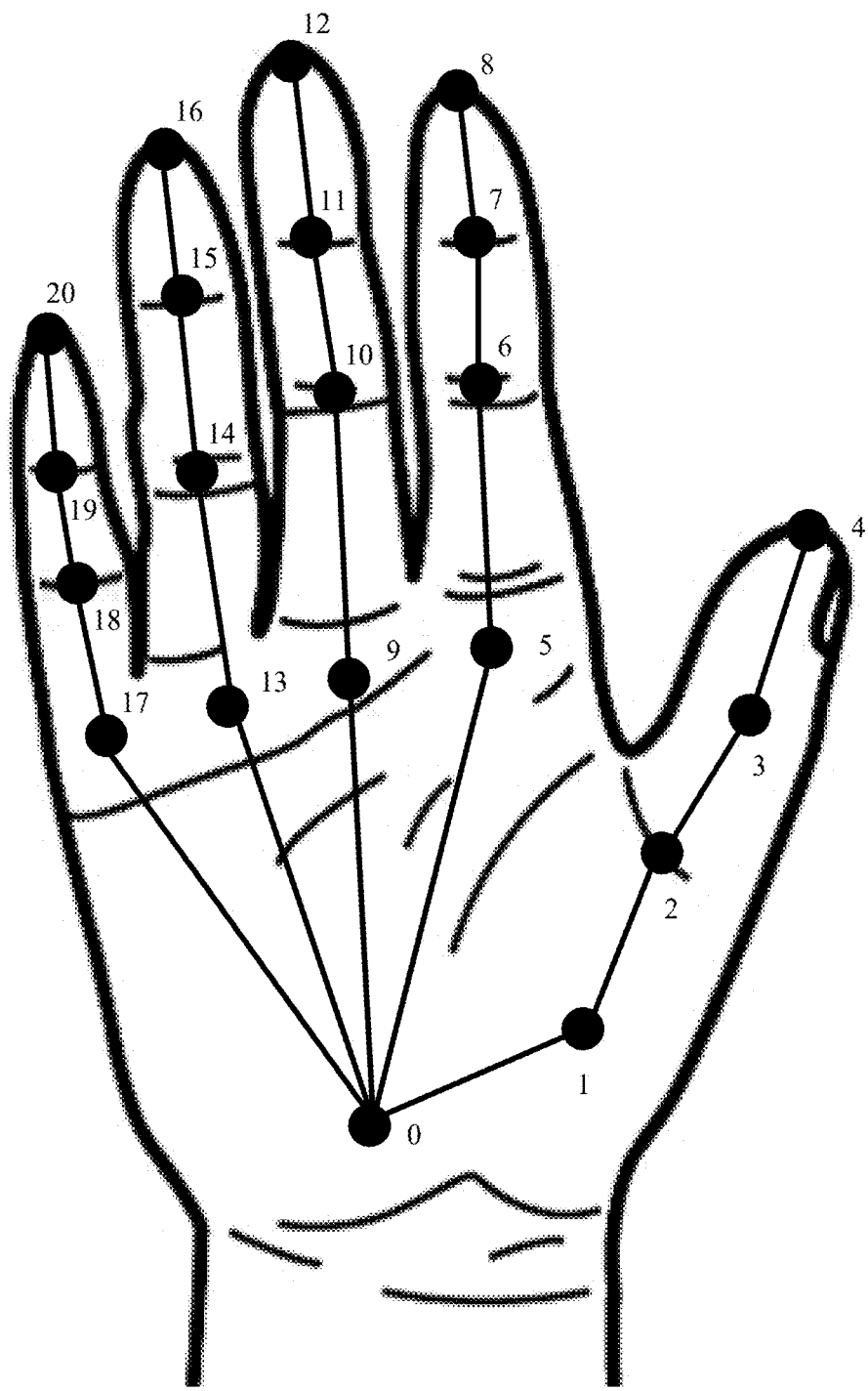
FIG. 5 is a schematic diagram of a key point identification result of a first hand according to an embodiment of this application.

Based on the image including the first hand, the key points of the first hand are identified according to a hand pose estimation algorithm. The hand pose estimation algorithm is an algorithm in which a hand key point is detected by training a neural network model, and a hand pose is described based on the hand key point. The key point herein may be a knuckle point or a skeletal point. For example, FIG. 5 is a schematic diagram of a key point identification result of a first hand according to an embodiment of this application. The electronic device may identify 21 key points of the hand according to the hand pose estimation algorithm. Alternatively, the electronic device may identify key points more or fewer than the 21 key points of the hand according to the hand pose estimation algorithm.

S302: Project the virtual keyboard on the first hand based on the key points of the first hand.

Figure 6A:
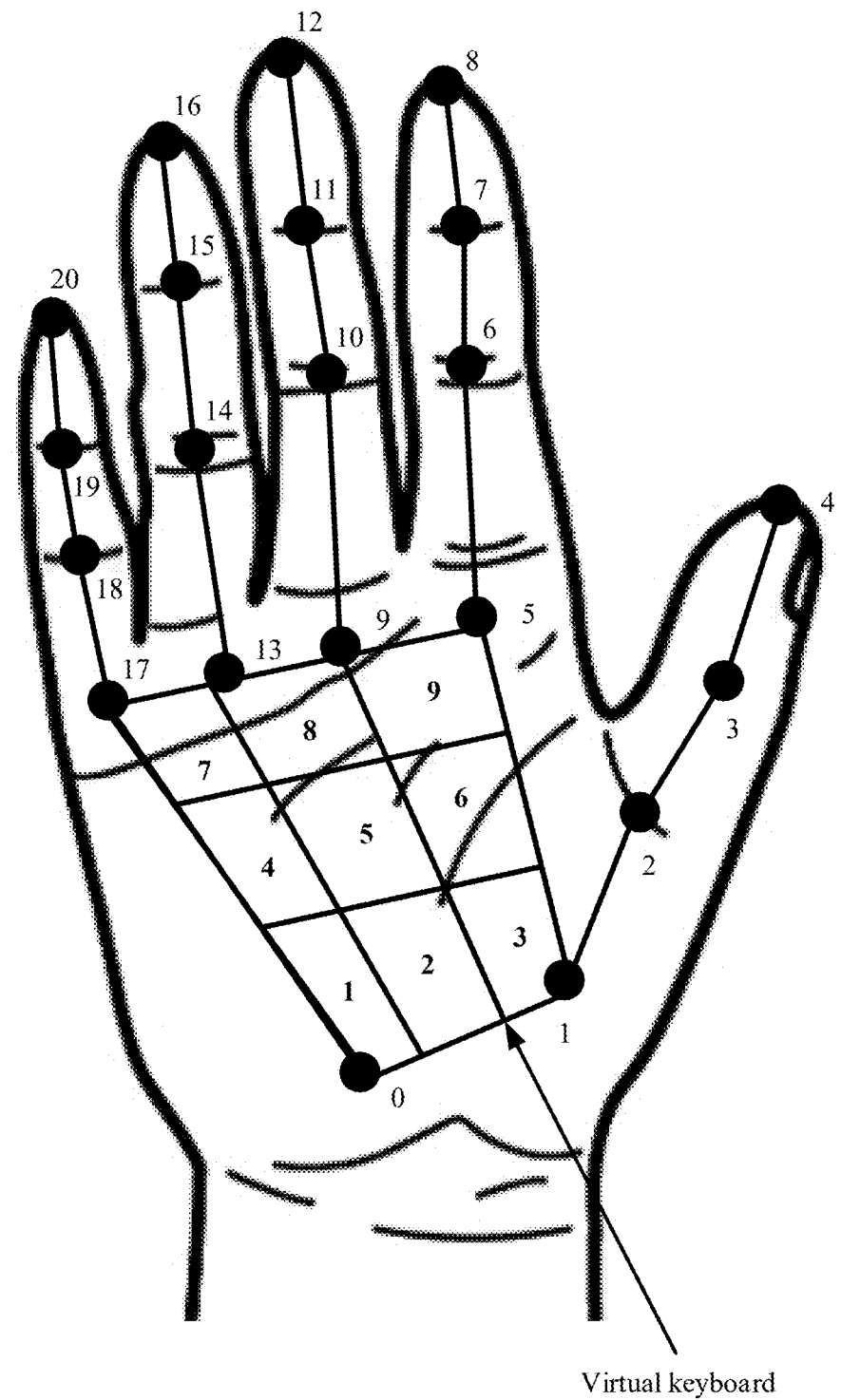
FIG. 6(a) and FIG. 6(b) are a schematic diagram of a virtual keyboard projected on a first hand according to an embodiment of this application.
Figure 6B:
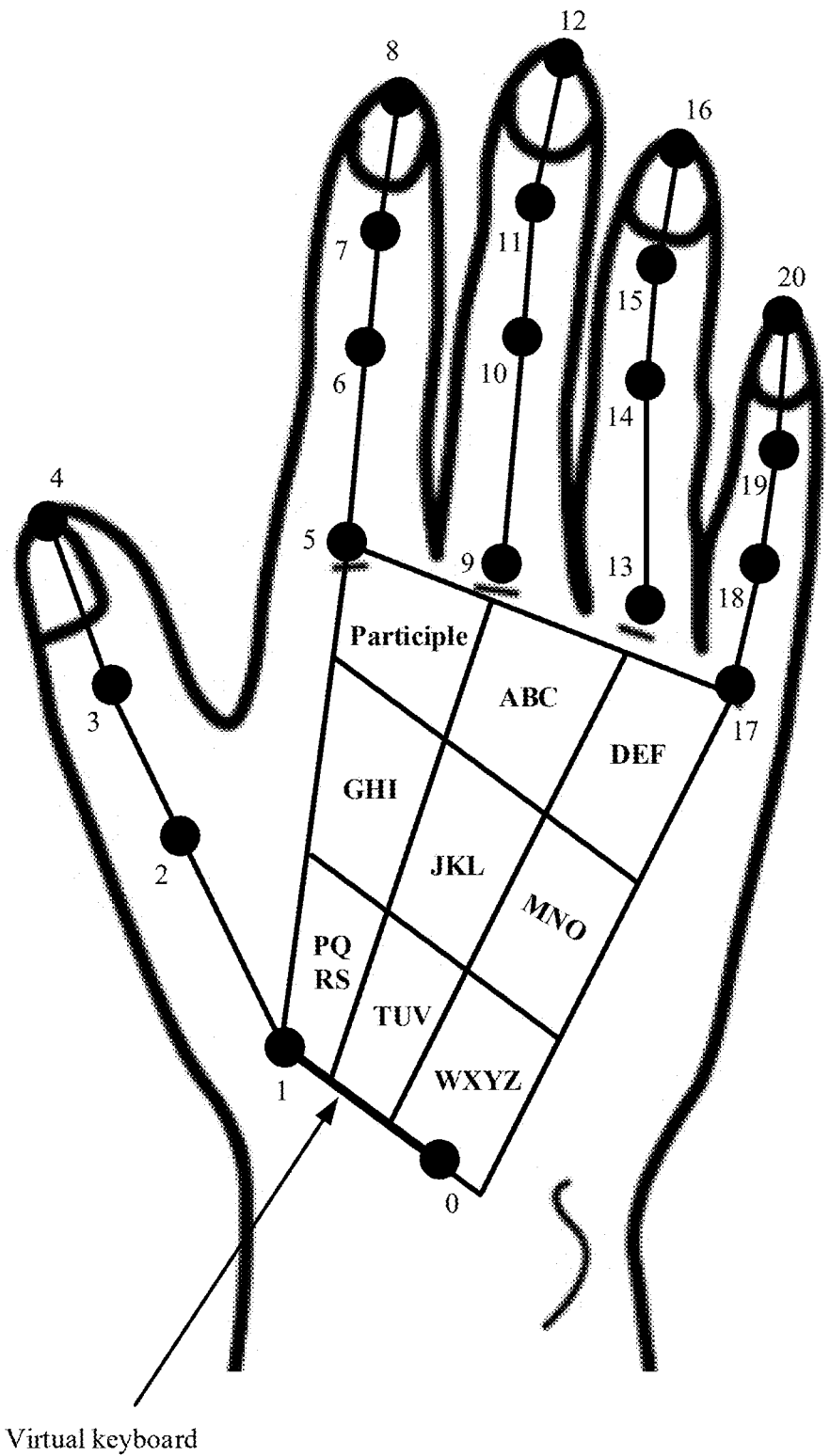

The electronic device may use the key points of the first hand as two-dimensional coordinates, and project the virtual keyboard on the first hand based on the key points of the first hand. For example, the electronic device may project the virtual keyboard on the first hand according to a computer vision affine algorithm. In some embodiments, as shown in FIG. 6(*a*), the virtual keyboard is projected on the palm of the first hand based on a key point 0, a key point 1, a key point 5, and a key point 17 of the palm of the first hand. In some embodiments, as shown in FIG. 6(*b*), the virtual keyboard is projected on the back of the first hand based on a key point 0, a key point 1, a key point 5, and a key point 17 of the back of the first hand. The virtual keyboard may be a numeric keyboard or a 9-key pinyin keyboard. This is not limited herein.

Figure 7:
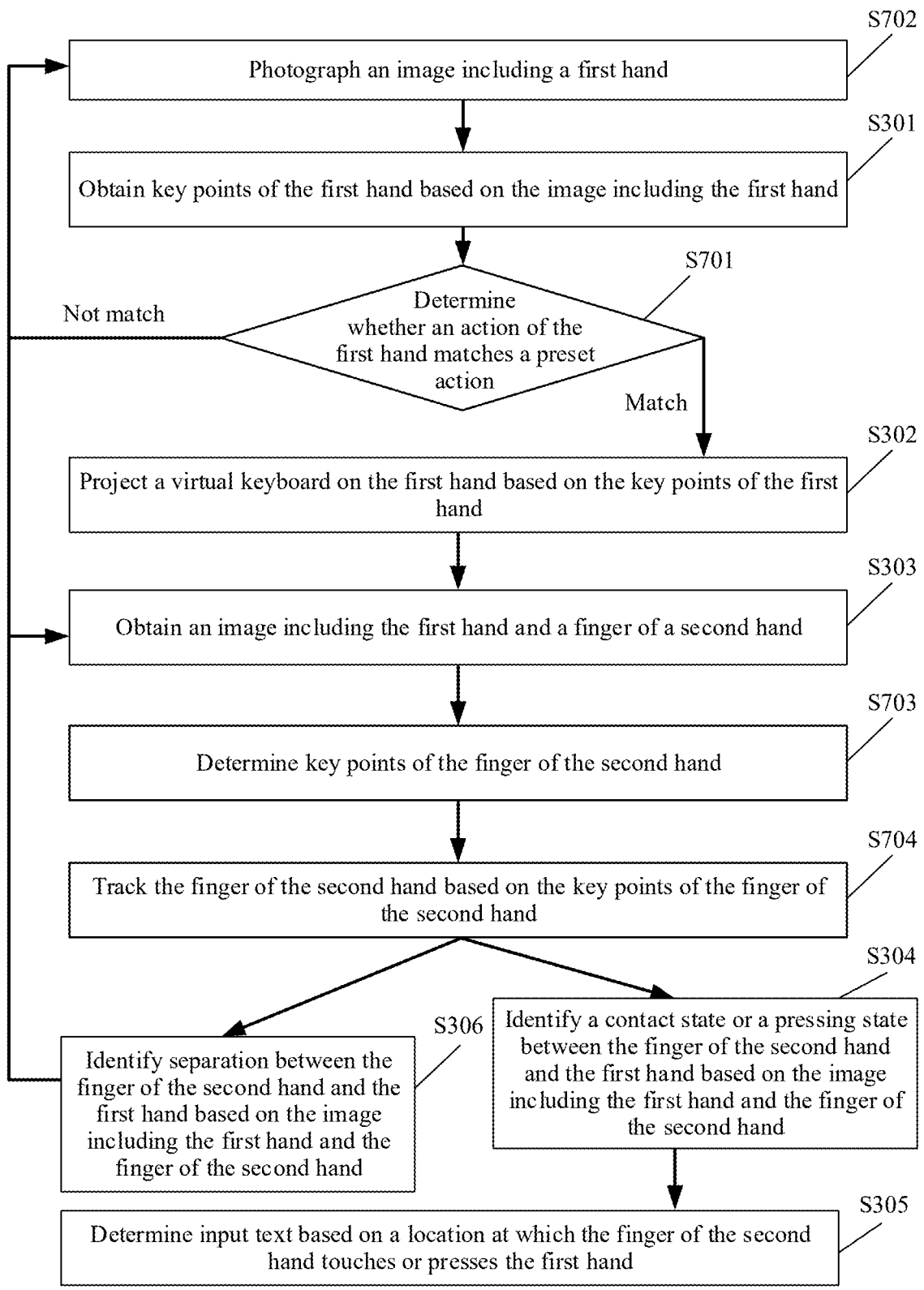
FIG. 7 is a flowchart of a text input method based on a virtual keyboard according to an embodiment of this application.

In some embodiments, as shown in FIG. 7, the electronic device identifies an action of the first hand based on a plurality of frames of image including the first hand, and determines whether the action of the first hand matches a preset action (operation S701). If the action of the first hand matches the preset action, the virtual keyboard is projected on the first hand based on the key points of the first hand (operation S302); or if the action of the first hand does not match the preset action, the electronic device photographs, by using the camera, the image including the first hand (operation S702), and obtains the key points of the first hand based on the image including the first hand (operation S301).

An action is a process of changing a location of a role's five organs (an expression change), changing a location of a role's limb (an action change), and changing a relative location of a role and an environment in which the role is in (a motion distance change). The electronic device may identify poses of the first hand in a plurality of consecutive frames according to the hand pose estimation algorithm, and determine the action of the first hand based on the poses of the first hand in the plurality of consecutive frames.

Figure 8:
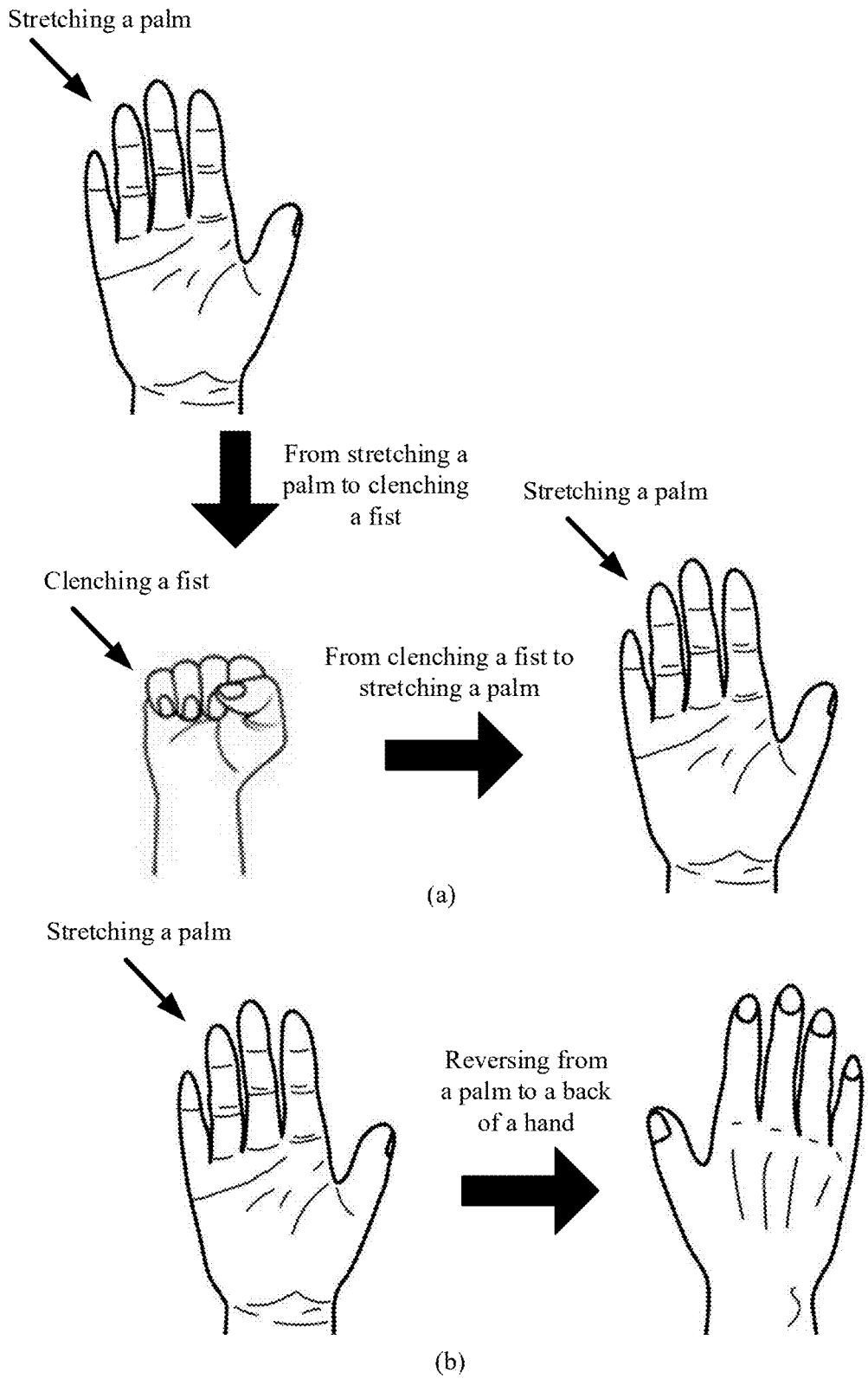
FIG. 8 is a schematic diagram of a preset action according to an embodiment of this application.

The preset action is a hand action preconfigured by the electronic device. It may be understood that an action matching the preset action is an action the same as the preset action. When determining that the action of the first hand is completely the same as the preset action, the electronic device considers that the action of the first hand matches the preset action, and the first hand is a target hand. For example, the preset action may be an action from clenching a first to stretching a palm. For another example, the preset action may be an action of reversing a palm to a back of a hand. For another example, the preset action may be an action of reversing a back to a palm of a hand. For example, (a) in FIG. 8 is a schematic diagram of an action from clenching a first to stretching a palm. The electronic device identifies an action from stretching a palm to clenching a fist, and an action from clenching a first to stretching a palm. As shown in (b) in FIG. 8, the electronic device identifies an action of reversing from a palm to a back of the hand.

It should be noted that, after the virtual keyboard is projected on the first hand, the electronic device may continuously photograph images including the first hand, recognize the consecutive images including the first hand, determine the key points of the first hand, track the first hand based on the key points of the first hand, and project the virtual keyboard based on the key points of the first hand. In this way, positioning of the first hand is implemented through real-time positioning and tracking of the key points of the first hand, the virtual keyboard can move with the first hand, effect that the virtual keyboard adheres to skin is implemented, and good user experience is ensured. For example, the electronic device continuously identifies, within each second, at least 20 frames of images including the first hand, determines the key points of the first hand, tracks the first hand based on the key points of the first hand, and projects the virtual keyboard based on the key points of the first hand.

S303: Obtain the image including the first hand and the finger of the second hand.

The electronic device photographs a second image by using the camera; detects, according to the object detection algorithm, the second image photographed by the camera; and determines that the second image includes the first hand and the finger of the second hand. Further, the electronic device continuously photographs images including the first hand and the finger of the second hand; performs image recognition on the consecutive images of the first hand and the finger of the second hand, to determine the key points of the finger of the second hand (operation S703); and tracks the finger of the second hand based on the key points of the finger of the second hand (operation S704). Therefore, positioning of the finger of the second hand is implemented through real-time positioning and tracking of the key points of the finger of the second hand; the contact state, the pressing state, or separation between the finger of the second hand and the first hand is identified; the input text can be accurately recognized, and user experience is improved.

It should be noted that a left-right relationship between the first hand and the second hand is not limited in this embodiment. For example, the first hand may be a left hand, and the second hand may be a right hand. For another example, the first hand may be the right hand, and the second hand may be the left hand. In some embodiments, after obtaining the second image and identifying that the second image includes the first hand and the finger of the second hand, the electronic device may also identify the left-right relationship between the first hand and the second hand.

S304: Identify the contact state or the pressing state between the finger of the second hand and the first hand based on the image including the first hand and the finger of the second hand.

Before the contact state, the pressing state, or separation between the finger of the second hand and the first hand is identified by using the neural network model, a large quantity of images including the first hand and the finger of the second hand are first captured by using the camera, and the images including the first hand and the finger of the second hand are analyzed. When the finger of the second hand touches or presses the first hand, the finger of the second hand blocks the location at which the finger of the second hand touches or presses the first hand. Therefore, texture of the first hand changes. Texture means a pattern or a line on a surface of an object, which is a linear pattern on the object. When a training set is constructed, texture features of the first hand in the large quantity of images including the first hand and the finger of the second hand are labeled, and the images that include the first hand and the finger of the second hand and that are labeled with the texture features of the first hand form the training set.

It may be understood that the training set includes a first-type training image, a second-type training image, a label of the first-type training image, and a label of the second-type training image. The first-type training image includes a plurality of images in which the finger of the second hand and the first hand are in the contact state or the pressing state, and the second-type training image includes a plurality of images in which the finger of the second hand and the first hand are separated.

When the neural network model is trained, a parameter of each layer in the neural network model is first initialized (in other words, an initial value is assigned to each parameter), and the training set is input into the neural network model. Then, the neural network model outputs a classification result. The classification result indicates a type of training image that is identified by the neural network model and that is in the training set. In some embodiments, the neural network model outputs a quantity of images in which the finger of the second hand and the first hand are in the contact state, a quantity of images in which the finger of the second hand and the first hand are in the pressing state, and a quantity of images in which the finger of the second hand and the first hand are separated. In a classification process, labels may be separately attached to the images about the contact state, the images about the pressing state, and the images about separation, to train the entire network.

A loss function value of a loss function is calculated based on the classification result, the label of the first-type training image, and the label of the second-type training image. The loss function value of the loss function may indicate an error between the classification result and the training set. When the loss function does not converge and the loss function value is greater than or equal to a threshold, the neural network model continues to be trained by using the foregoing method. When the loss function converges and the loss function value is less than the threshold, a parameter of the neural network model is obtained. Alternatively, if all training images in the training set are used to complete training, training of the neural network model is completed. It should be noted that, for an image whose size is less than or equal to 56×56 pixels and that is input to the neural network model, a weight value of the neural network model is less than or equal to 500 K, to improve a processing speed of image recognition by the processor.

Figure 9:
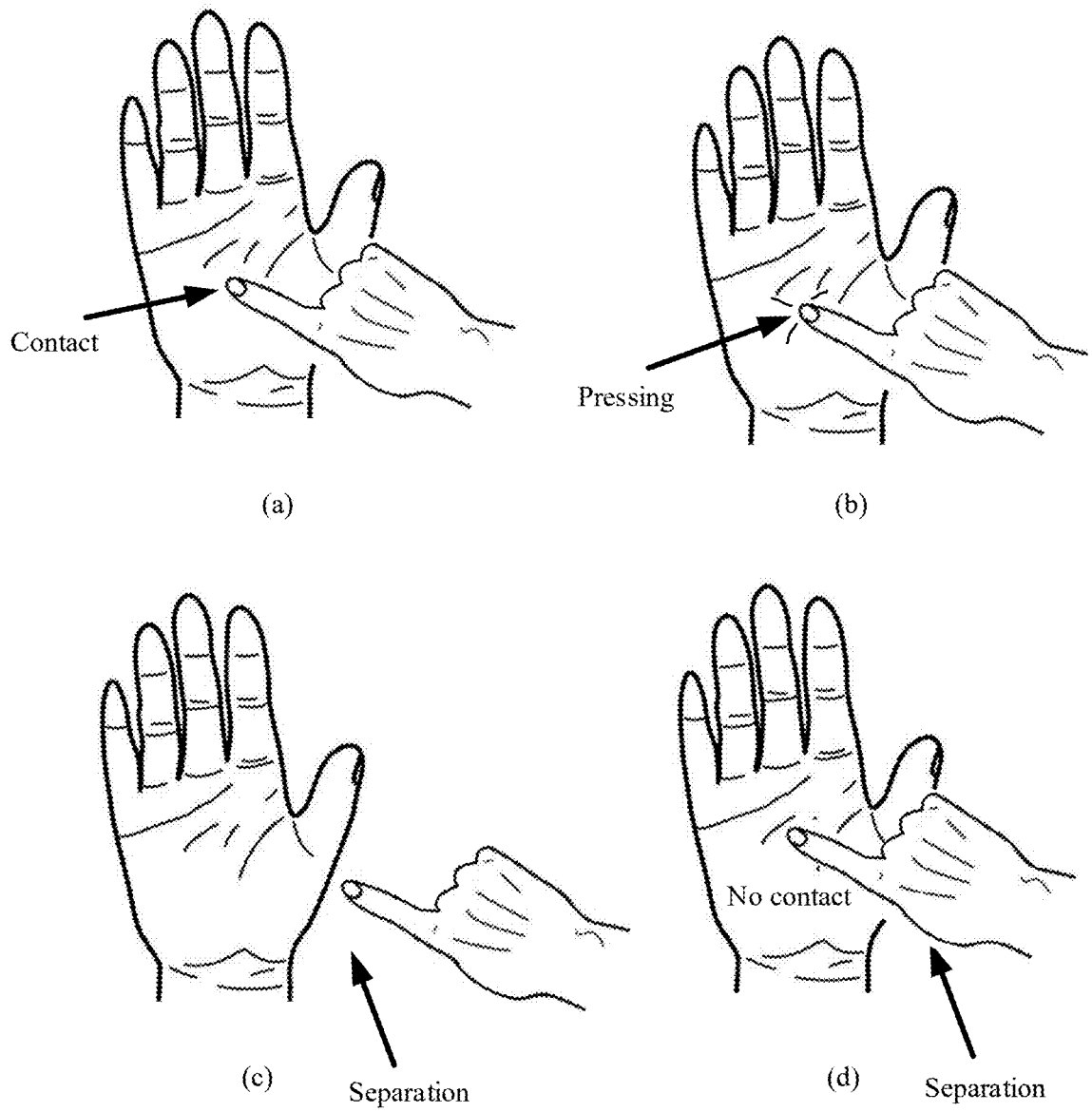
FIG. 9 is a schematic diagram of a state between a finger of a second hand and a first hand according to an embodiment of this application.

When the neural network model is inferred, the image including the first hand and the finger of the second hand is input into the neural network model, and the image including the first hand and the finger of the second hand is analyzed by using the neural network model, to identify whether the texture of the first hand changes. Therefore, the contact state between the finger of the second hand and the first hand, the pressing state between the finger of the second hand and the first hand, or separation between the finger of the second hand and the first hand is identified. The neural network model may further recognize the plurality of consecutive frames of images including the first hand and the finger of the second hand; and identify, based on a change of the texture of the first hand in the plurality of consecutive frames, that the finger of the second hand is separated from the first hand. For example, (a) in FIG. 9 is a schematic diagram in which the finger of the second hand touches the first hand. When the finger of the second hand touches the first hand, the texture change of the first hand is small. (b) in FIG. 9 is a schematic diagram in which the finger of the second hand presses the first hand. When the finger of the second hand presses the first hand, the texture of the first hand changes greatly. (c) in FIG. 9 is a schematic diagram in which the finger of the second hand is separated from the first hand. (d) in FIG. 9 is a schematic diagram in which the finger of the second hand is separated from the first hand. In this case, the finger of the second hand is above the palm of the first hand, but the finger of the second hand is not in contact with the palm of the first hand.

As shown in FIG. 7, if the electronic device identifies separation between the finger of the second hand and the first hand based on the image including the first hand and the finger of the second hand (operation S306), the electronic device photographs, by using the camera, the image including the first hand (operation S702), and obtains the image including the first hand to perform operation S301; or obtains the image including the first hand and the finger of the second hand to perform operation S303.

It should be noted that, when the finger of the second hand touches or presses the first hand, a color of the finger of the second hand changes with different force used by the finger of the second hand. For example, when the finger of the second hand presses the first hand, a fingernail of the finger of the second hand is white and light red. For another example, when the finger of the second hand touches the first hand, the fingernail of the finger of the second hand is light red. In a process from a time point when the finger of the second hand touches the first hand to a time point when the finger of the second hand leaves the first hand, the fingernail of the finger of the second hand also changes. Therefore, when identifying that the finger of the second hand touches, presses, and is separated from the first hand, the neural network model may identify the contact state, the pressing state, or separation between the finger of the second hand and the first hand based on the image including the first hand and the finger of the second hand and an optical flow of the finger of the second hand. Therefore, accuracy of identifying the contact state, the pressing state, or separation between the finger of the second hand and the first hand is further improved.

In some embodiments, the image input into the neural network model may be a partial image that includes the finger of the second hand and that is captured from the image including the first hand and the finger of the second hand.

In addition, the neural network model may further output the fingertip key points of the finger of the second hand, to determine the input text based on the location at which the fingertip key points of the finger of the second hand touch or press the first hand.

It may be understood that, in this application, the contact state, the pressing state, or separation between the finger of the second hand and the first hand may be determined based on a label that is set for training data in the training process of the neural network. In the training process of the neural network, for neural networks obtained through training in different training data classification manners, state relationships that are between the finger of the second hand and the first hand and that are output in an inference process may also be different.

S305: Determine the input text based on the location at which the finger of the second hand touches or presses the first hand.

Before the input text is determined based on the location at which the finger of the second hand touches or presses the first hand, it is first determined whether the finger of the second hand is within a key area. In some embodiments, it is assumed that the key area is a polygon area formed by a plurality of points. Ray is horizontally drawn by using a point at the fingertip of the finger of the second hand, and a quantity of intersections between the ray and sides of the polygon is determined. If the quantity of intersections between the ray and the sides of the polygon is an even number, it is determined that the finger of the second hand is not in the key area; and if quantity of intersections between the ray and the sides of the polygon is an odd number, it is determined that the finger of the second hand is in the key area.

Figure 10:
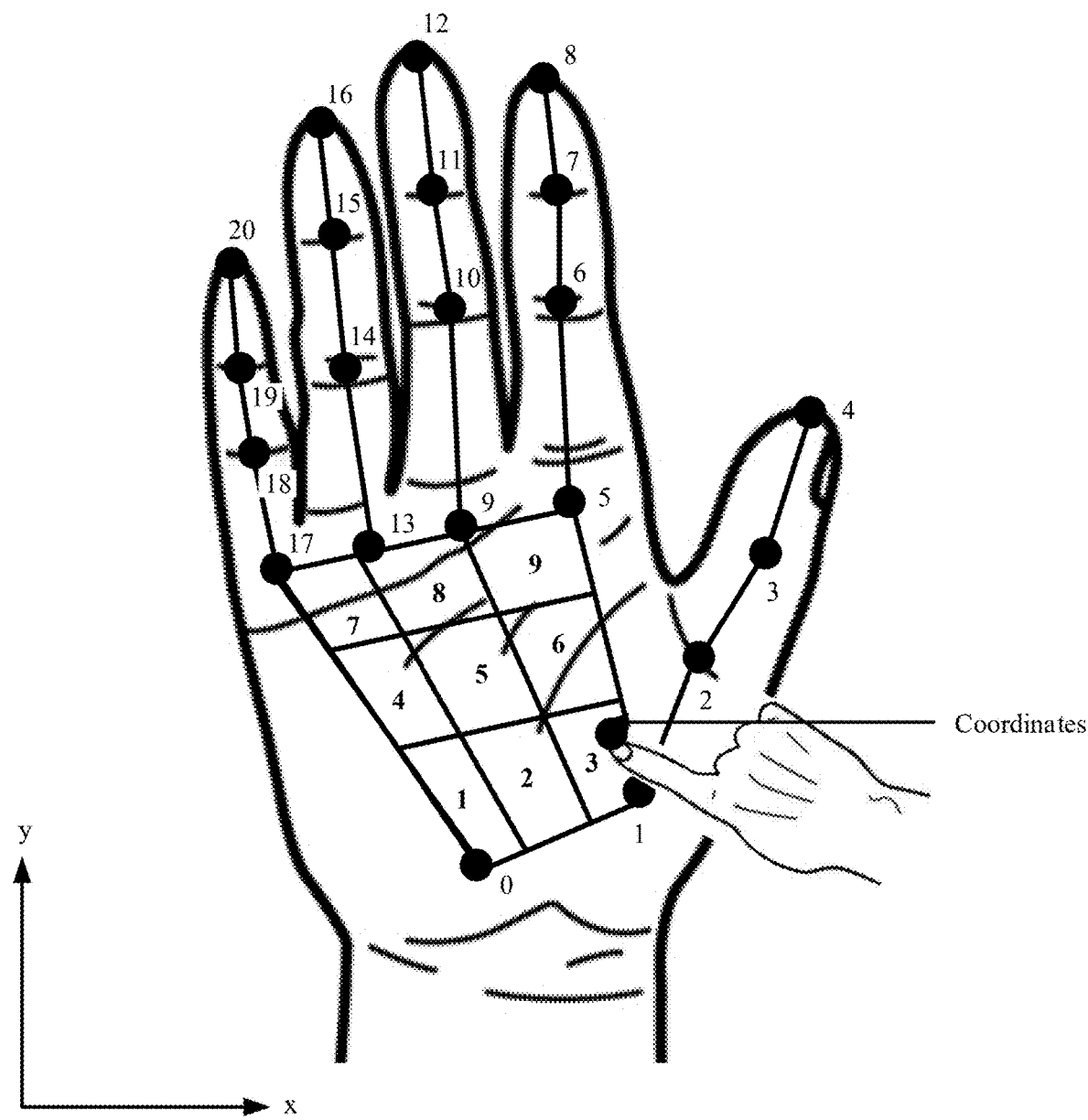
FIG. 10 is a schematic diagram of determined input text according to an embodiment of this application.
Figure 11A:
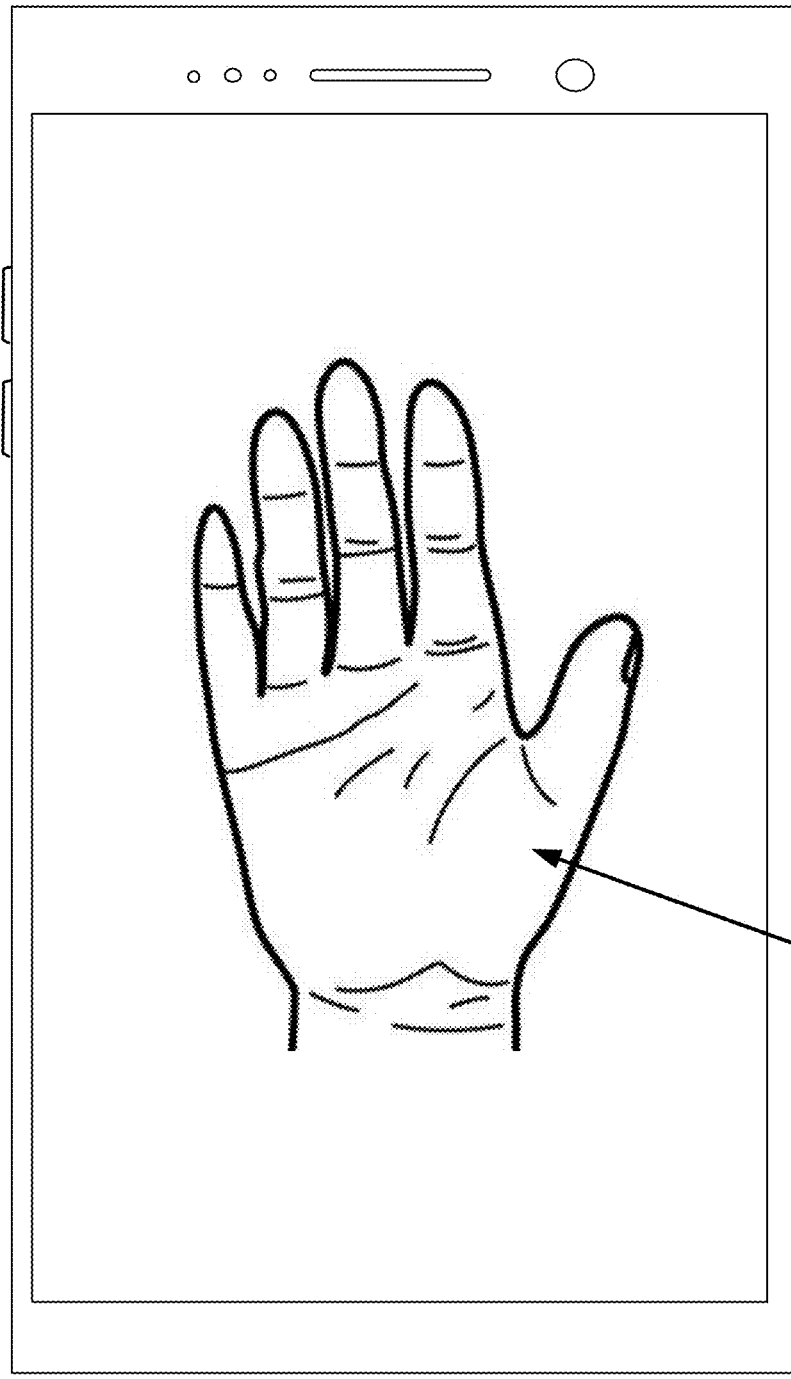
FIG. 11(a), FIG. 11(b) and FIG. 11(c) are a schematic diagram of a text input process based on a virtual keyboard according to an embodiment of this application.
Figure 11A:
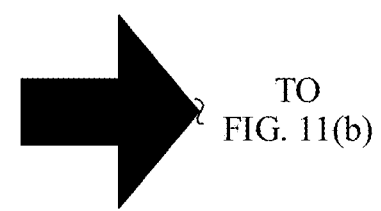
Figures 11A, 11B, 11C:
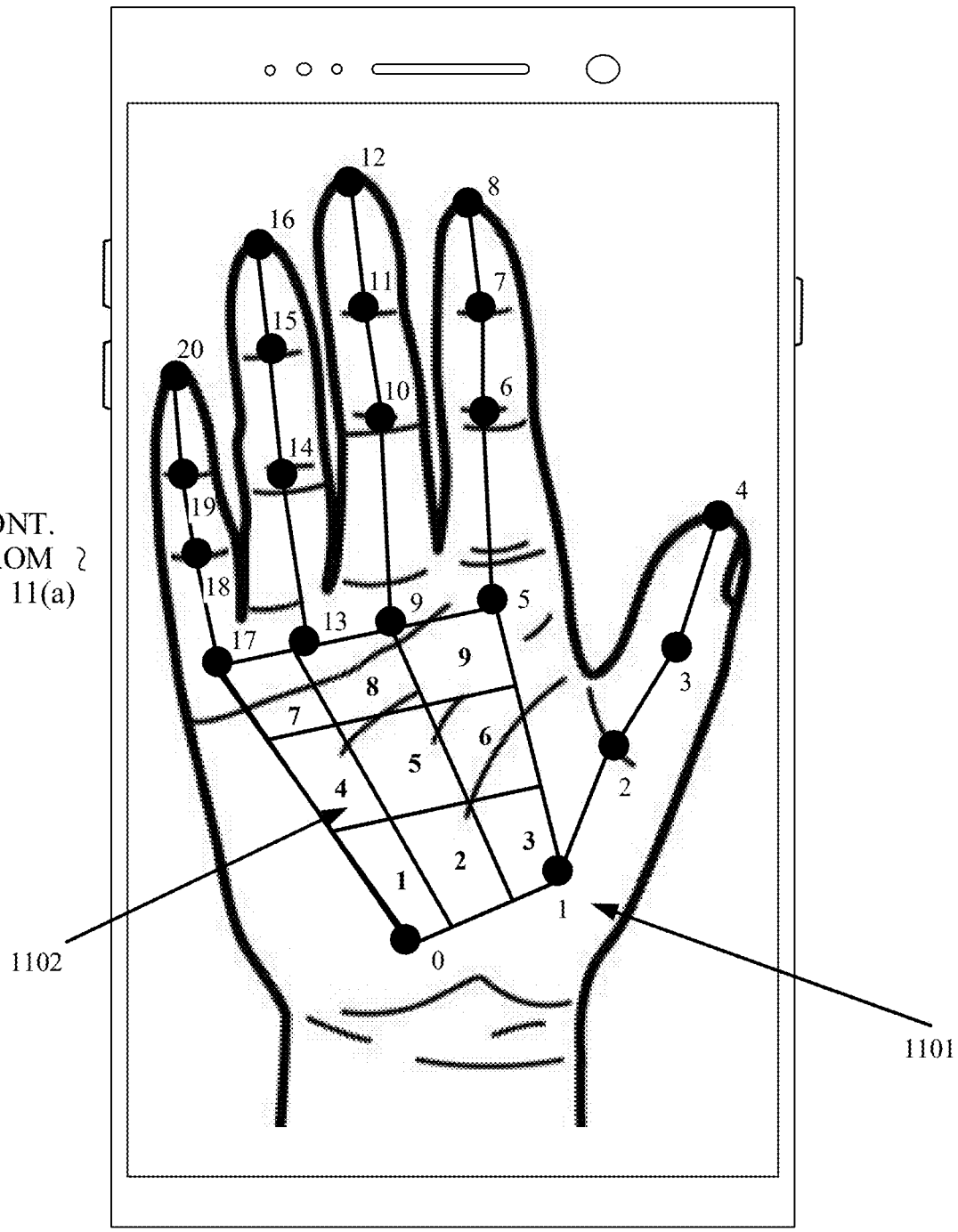
Figure 11C:
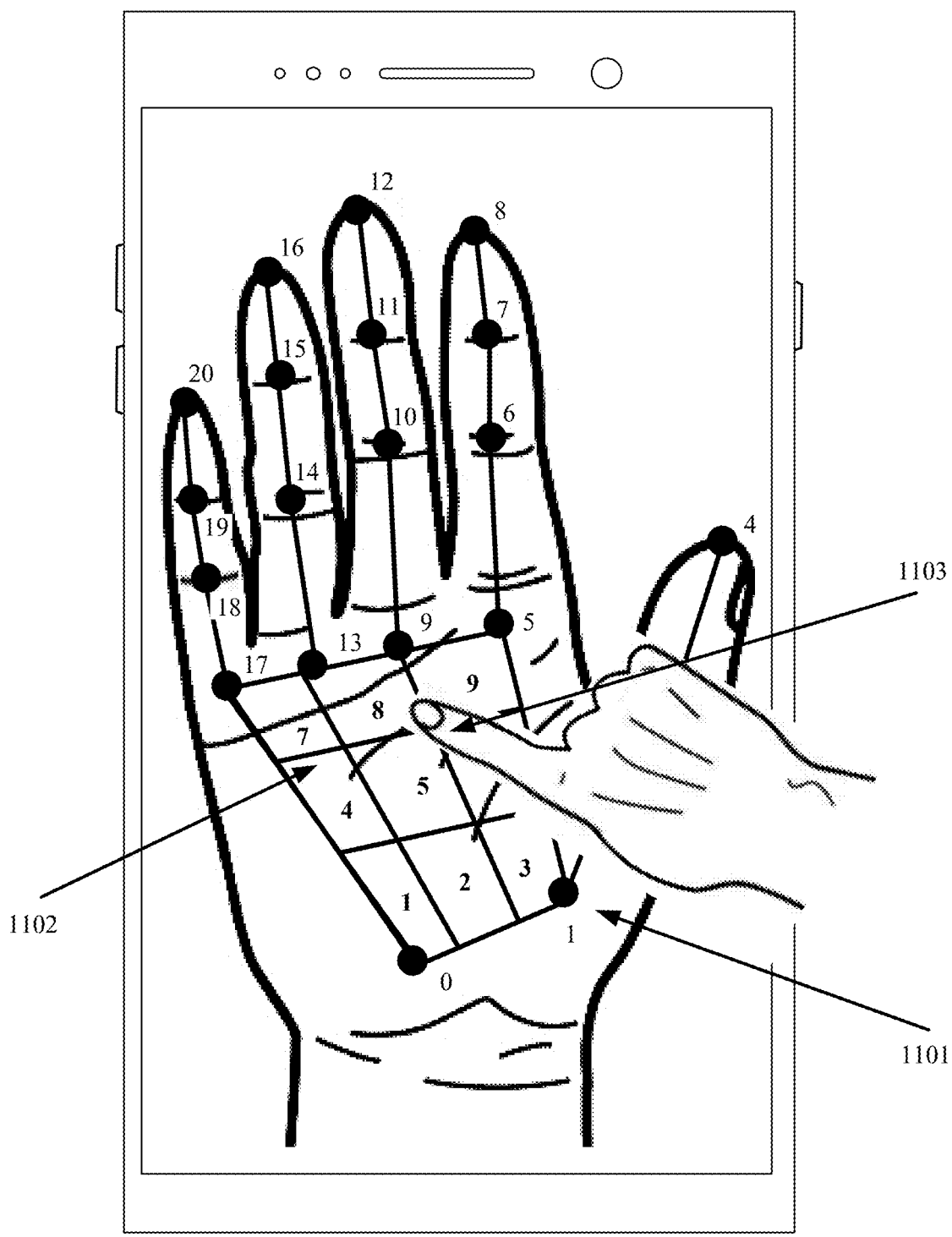

Further, the location at which the finger of the second hand touches or presses the first hand is determined based on the fingertip coordinates of the finger of the second hand and the coordinates of the virtual keyboard; and the input text is determined based on the location at which the finger of the second hand touches or presses the first hand. The virtual keyboard may be projected on a two-dimensional coordinate system, and two-dimensional coordinates may be set for boundary points (the key point 0, the key point 1, the key point 5, the key point 9, the key point 13, and the key point 17 of the first hand) and keys of the virtual keyboard. The finger of the second hand touches or presses the first hand to determine the two-dimensional coordinates of the finger of the second hand, and coordinates in the two-dimensional coordinate system of the virtual keyboard may be determined based on the two-dimensional coordinates of the finger of the second hand, to determine the input text. For example, as shown in FIG. 10, it is determined, based on the coordinates of the finger of the second hand and the location at which the finger of the second hand touches or presses the first hand, that the input text is a number 3.

Further, the VR device may establish a virtual model of the first hand and a virtual model of the finger of the second hand; and restore, based on the virtual model of the first hand and the virtual model of the finger of the second hand, the text input process in the virtual world in a computer vision rendering manner. Alternatively, the AR device may combine the virtual model of the first hand and the virtual model of the finger of the second hand with the real world, so that the user intuitively sees the text input process.

It should be noted that a location in which the virtual keyboard is projected is not limited in this embodiment. After the electronic device photographs an image that includes another human body part such as an arm, the electronic device identifies a skeletal point of the other human body part, and projects the virtual keyboard on the other human body part based on the skeletal point of the other human body part.

With reference to FIG. 11(*a*), FIG. 11(*b*) and FIG. 11(*c*), the following uses an example in which the electronic device is a mobile phone to describe a text input process based on a virtual keyboard.

The mobile phone photographs a first image, and the first image includes a first hand 1101 (shown FIG. 11(*a*)). The mobile phone identifies key points of the first hand, and projects a virtual keyboard 1102 (shown in FIG. 11(*b*)) on the first hand based on the key points of the first hand. The mobile phone photographs a second image, and the second image includes the first hand 1101 and a finger 1103 of the second hand (shown in FIG. 11(*c*)). The mobile phone identifies a contact state or a pressing state between the finger 1103 of the second hand and the first hand 1101 based on the image including the first hand 1101 and the finger 1103 of the second hand. The mobile phone first determines, based on a location at which the finger 1103 of the second hand touches or presses the first hand 1101, that the finger 1103 of the second hand is in a range of an area in which a number 8 is located, and determines input text. For example, if the location at which the finger 1103 of the second hand touches or presses the first hand 1101 shown in FIG. 11(*c*) is a location of the number 8, it is determined that the input text is the number 8.

It may be understood that, to implement the functions in the foregoing embodiments, the electronic device includes a corresponding hardware structure and/or a corresponding software module for performing each function. A person skilled in the art should be easily aware that, in combination with the units and the method operations in the examples described in embodiments disclosed in this application, this application can be implemented through hardware or a combination of hardware and computer software. Whether a function is performed through hardware or hardware driven by computer software depends on particular application scenarios and design constraint conditions of the technical solutions.

Figure 12:
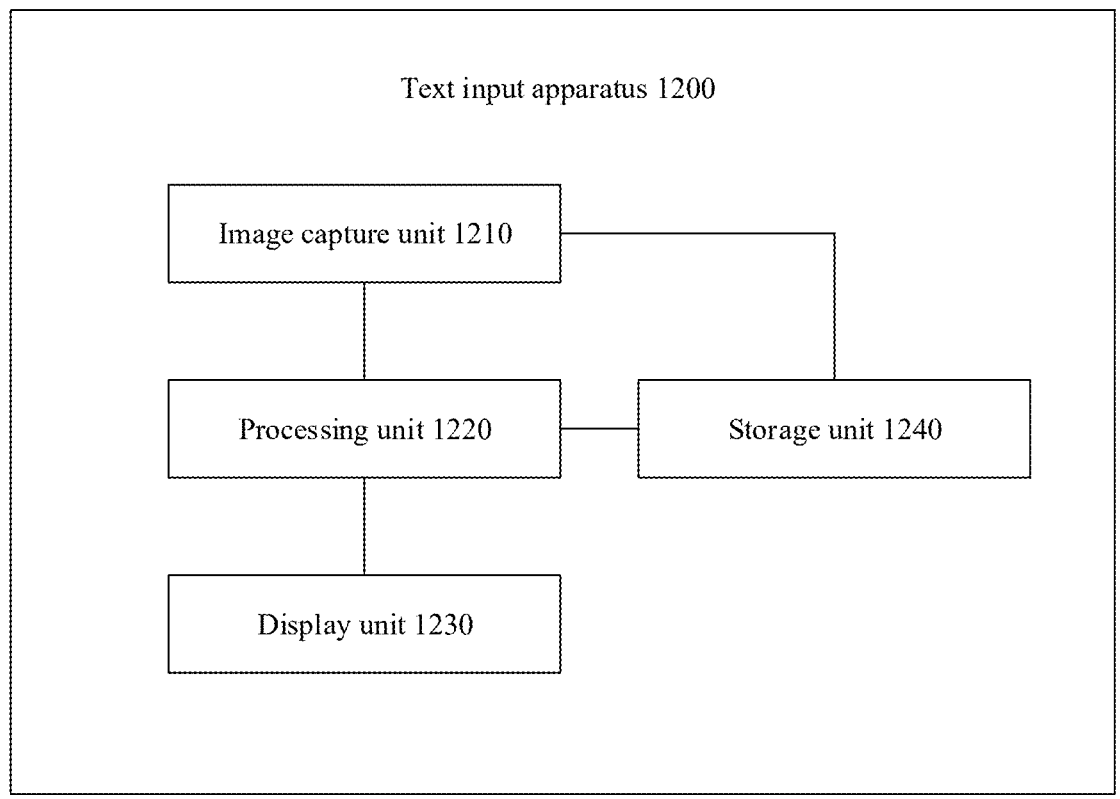
FIG. 12 is a schematic diagram of a text input apparatus according to an embodiment of this application.

FIG. 12 is a schematic diagram of a structure of a text input apparatus according to an embodiment of this application. This text input apparatus may be configured to implement functions of the electronic device in the foregoing method embodiments, and therefore can also achieve beneficial effect of the foregoing method embodiments. In this embodiment of this application, the text input apparatus may be the electronic device shown in FIG. 1, or may be a module (for example, a chip) used in the electronic device.

As shown in FIG. 12, the text input apparatus 1200 includes an image capture unit 1210, a processing unit 1220, a display unit 1230, and a storage unit 1240. The text input apparatus 1200 is configured to implement functions of the electronic device in the method embodiments shown in FIG. 3 and FIG. 7. The image capture unit 1210 is configured to capture an image including a first hand and an image including the first hand and a finger of a second hand. The storage unit 1240 is configured to store instructions executed by the processing unit 1220, store input data required by the processing unit 1220 to run the instructions, or store data generated after the processing unit 1220 runs the instructions. The processing unit 1220 may execute a function of the processor 110 in the electronic device shown in FIG. 1.

In some embodiments, the processing unit 1220 is configured to obtain key points of the first hand based on the image including the first hand. The processing unit 1220 is further configured to project a virtual keyboard on the first hand based on the key points of the first hand. For example, the virtual key is projected on a palm or a back of the first hand. The processing unit 1220 is further configured to identify a contact state or a pressing state between the finger of the second hand and the first hand based on the image including the first hand and the finger of the second hand. The processing unit 1220 is further configured to: when the finger of the second hand and the first hand are in the contact state or the pressing state, determine input text based on a location at which the finger of the second hand touches or presses the first hand.

In some embodiments, when the processing unit 1220 is configured to identify the contact state or the pressing state between the finger of the second hand and the first hand based on the image including the first hand and the finger of the second hand, the processing unit 1220 is configured to: analyze, by using a preset neural network model, the image including the first hand and the finger of the second hand; identify the contact state or the pressing state between the finger of the second hand and the first hand; and obtain fingertip key points of the finger of the second hand.

In some embodiments, when the processing unit 1220 is configured to identify the contact state or the pressing state between the finger of the second hand and the first hand based on the image including the first hand and the finger of the second hand, the processing unit 1220 is configured to: analyze, by using a preset neural network model, the image including the first hand and the finger of the second hand and an optical flow of the finger of the second hand; identify the contact state or the pressing state between the finger of the second hand and the first hand; and obtain fingertip key points of the finger of the second hand.

In some embodiments, when the processing unit 1220 is configured to determine the input text based on the location at which the finger of the second hand touches or presses the first hand, the processing unit 1220 is configured to: determine, based on fingertip coordinates of the finger of the second hand and coordinates of the virtual keyboard, the location at which the finger of the second hand touches or presses the first hand, and determine the input text based on the location at which the finger of the second hand touches or presses the first hand.

In some embodiments, when the processing unit 1220 is configured to project the virtual keyboard on the first hand based on the key points of the first hand, the processing unit 1220 is configured to: identify an action of the first hand based on a plurality of frames of images including the first hand; determine that the action of the first hand matches a preset action; and project the virtual keyboard based on the key points of the first hand. The preset action is from clenching a first to stretching a palm.

In some embodiments, the processing unit 1220 is further configured to: identify, based on the image comprising the first hand and the finger of the second hand, that the finger of the second hand and the first hand are separated; and when the finger of the second hand and the first hand are separated, obtain the image including the first hand or obtaining the image including the first hand and the finger of the second hand by using the image capture unit.

In some embodiments, the processing unit 1220 is further configured to input a training set into the neural network model. The neural network model outputs a classification result. The training set includes a first-type training image, a second-type training image, a label of the first-type training image, and a label of the second-type training image. The first-type training image includes a plurality of images in which the finger of the second hand and the first hand are in the contact state or the pressing state, and the second-type training image includes a plurality of images in which the finger of the second hand and the first hand are separated. The processing unit 1220 is further configured to: calculate a loss function value of a loss function based on the classification result; and when the loss function converges and the loss function value is less than or equal to a threshold, obtain a parameter of the neural network model.

The display unit 1230 is configured to display the first hand, the finger of the second hand, and the input text determined by the processing unit 1220.

Figure 3:
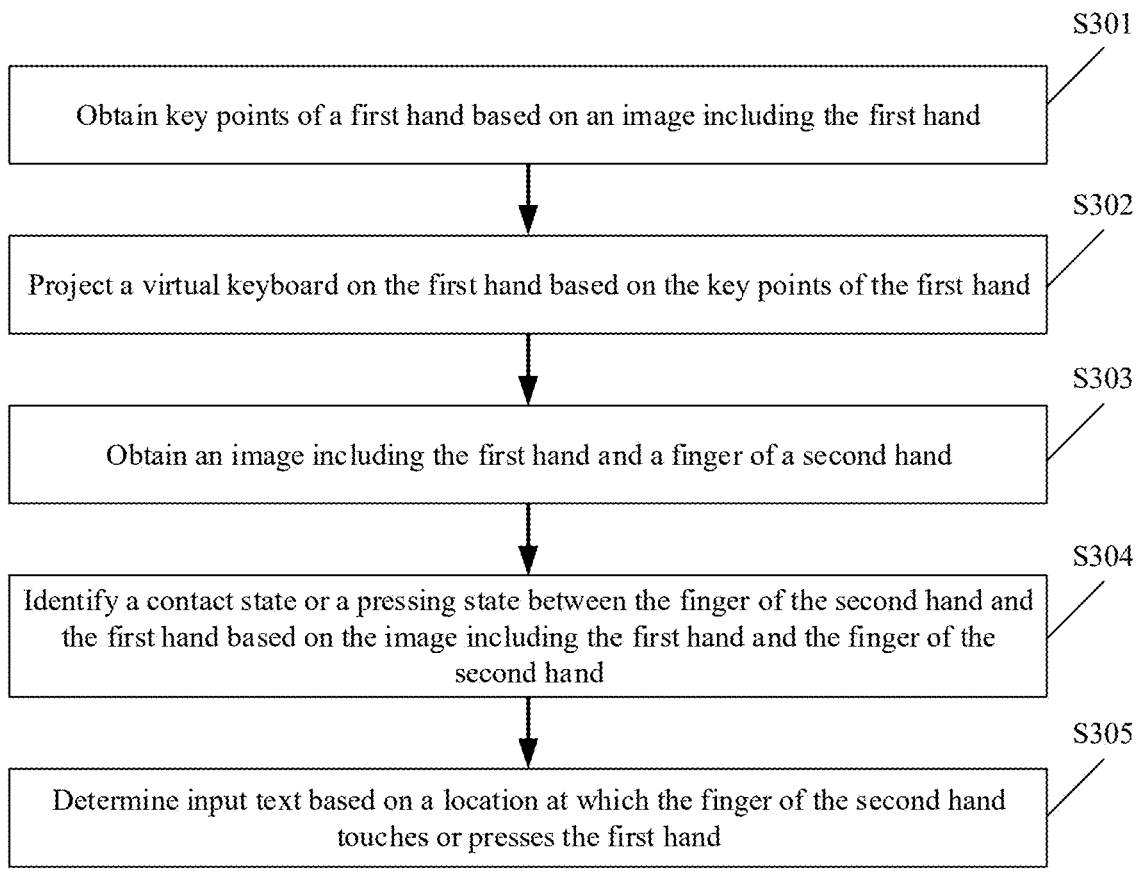
FIG. 3 is a flowchart of a text input method based on a virtual keyboard according to an embodiment of this application.

For more detailed descriptions of the processing unit 1220, directly refer to related descriptions in the method embodiments shown in FIG. 3 and FIG. 7. Details are not described herein again.

It may be understood that the processor in embodiments of this application may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor, any conventional processor, or the like.

The method operations in embodiments of this application may be implemented in a hardware manner, or may be implemented in a manner of executing software instructions by the processor. The software instructions may include a corresponding software module. The software module may be stored in a random access memory (RAM), a flash memory, a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a CD-ROM, or any other form of storage medium well-known in the art. For example, a storage medium is coupled to the processor, so that the processor can read information from the storage medium and write information into the storage medium. Certainly, the storage medium may be a component of the processor. The processor and the storage medium may be located in an ASIC. In addition, the ASIC may be located in a network device or a terminal device. Certainly, the processor and the storage medium may exist in the network device or the terminal device as discrete components.

All or some of foregoing embodiments may be implemented through software, hardware, firmware, or any combination thereof. When the software is used to implement embodiments, all or some of embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired manner or in a wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid-state drive (SSD).

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" describes an association relationship between associated objects and represents that three relationships may exist. For example, "A and/or B" may represent the following three cases: Only A exists, both A and B exist, and only B exists, where A and B may be singular or plural. In the text descriptions of this application, the character "/" indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. Sequence numbers of the foregoing processes do not mean execution sequences. The execution sequences of the processes should be determined based on functions and internal logic of the processes.

What is claimed is:

1. A text input method based on a virtual keyboard, the method comprising:
   obtaining key points of a first hand based on a first image comprising the first hand;
   projecting a virtual keyboard on the first hand based on the key points of the first hand;
   obtaining a second image comprising the first hand and a finger of a second hand;
   analyzing the second image using a preset neural network model trained to detect a contact state or a pressing state based on texture changes of the first hand, wherein the neural network model was trained with a training set comprising a plurality of first-type training images and a plurality of second-type training images, wherein the plurality of first-type training images comprise the finger of the second hand in a contact state or a pressing state and comprise labels of texture features of the first hand, and the plurality of second-type training images comprise the finger of the second hand separated from the first hand;

in response to analyzing the second image using the preset neural network model, identifying, by the neural network model based on detecting a change in texture on the first hand, the contact state or the pressing state between the finger of the second hand and the first hand; and when the finger of the second hand and the first hand are in the contact state or the pressing state, determining input text based on a location at which the finger of the second hand touches or presses the first hand.

2. The method according to claim 1, wherein the projecting the virtual keyboard further comprises:
projecting the virtual keyboard on a palm of the first hand based on key points of the palm of the first hand.

3. The method according to claim 1, wherein the projecting the virtual keyboard further comprises:
projecting the virtual keyboard on a back of the first hand based on key points of the back of the first hand.

4. The method according to claim 1, wherein the identifying the contact state or the pressing state further comprises:
obtaining fingertip key points of the finger of the second hand.

5. The method according to claim 1, wherein the identifying the contact state or the pressing state further comprises:
analyzing, by using the preset neural network model, the second image and an optical flow of the finger of the second hand; and
identifying the contact state or the pressing state between the finger of the second hand and the first hand; and
obtaining fingertip key points of the finger of the second hand.

6. The method according to claim 1, wherein the determining the input text further comprises:
determining, based on fingertip coordinates of the finger of the second hand and coordinates of the virtual keyboard, the location at which the finger of the second hand touches or presses the first hand; and
determining the input text based on the location at which the finger of the second hand touches or presses the first hand.

7. The method according to claim 1, wherein the projecting the virtual keyboard on the first hand further comprises:
identifying an action of the first hand based on a plurality of frames of images comprising the first hand; and
determining that the action of the first hand matches a preset action, and projecting the virtual keyboard based on the key points of the first hand.

8. The method according to claim 7, wherein the preset action is from clenching a fist to stretching a palm.

9. The method according to claim 1, wherein after the obtaining the second image, the method further comprises:
identifying, based on the second image, that the finger of the second hand and the first hand are separated; and
when the finger of the second hand and the first hand are separated, obtaining a third image.

10. The method according to claim 1, wherein after the determining the input text, the method further comprises:
displaying the first hand, the finger of the second hand, and the input text.

11. A text input apparatus, comprising:
a processing unit, configured to obtain key points of a first hand based on a first image comprising the first hand, wherein the processing unit is further configured to project a virtual keyboard on the first hand based on the key points of the first hand; and an image capture unit, configured to obtain a second image comprising the first hand and a finger of a second hand, wherein
the processing unit is further configured to:
analyze the second image using a preset neural network model trained to detect a contact state or a pressing state based on texture changes of the first hand, wherein the neural network model was trained with a training set comprising a plurality of first-type training images and a plurality of second-type training images, wherein the plurality of first-type training images comprise the finger of the second hand in a contact state or a pressing state and comprise labels of texture features of the first hand, and the plurality of second-type training images comprise the finger of the second hand separated from the first hand;
in response to analyzing the second image using the preset neural network model, identify, by the neural network model based on detecting a change in texture on the first hand, the contact state or the pressing state between the finger of the second hand and the first hand; and
when the finger of the second hand and the first hand are in the contact state or the pressing state, determine input text based on a location at which the finger of the second hand touches or presses the first hand.

12. The apparatus according to claim 11, wherein, when the processing unit is configured to project the virtual keyboard on the first hand, the processing unit is further configured to:
project the virtual keyboard on a palm of the first hand based on key points of the palm of the first hand.

13. The apparatus according to claim 11, wherein, when the processing unit is configured to project the virtual keyboard on the first hand, the processing unit is further configured to:
project the virtual keyboard on a back of the first hand based on key points of the back of the first hand.

14. The apparatus according to claim 11, wherein, when the processing unit is configured to identify the contact state or the pressing state, the processing unit is further configured to:
obtain fingertip key points of the finger of the second hand.

15. The apparatus according to claim 11, wherein, when the processing unit is configured to identify the contact state or the pressing state, the processing unit is configured to:
analyze, by using the preset neural network model, the second image and an optical flow of the finger of the second hand;
identify the contact state or the pressing state between the finger of the second hand and the first hand; and
obtain fingertip key points of the finger of the second hand.

16. The apparatus according to claim 11, wherein, when the processing unit is configured to determine the input text, the processing unit is configured to:
determine, based on fingertip coordinates of the finger of the second hand and coordinates of the virtual keyboard, the location at which the finger of the second hand touches or presses the first hand; and
determine the input text based on the location at which the finger of the second hand touches or presses the first hand.

17. The apparatus according to claim 11, wherein, when the processing unit is configured to project the virtual keyboard on the first hand, the processing unit is configured to:
- identify an action of the first hand based on a plurality of frames of images comprising the first hand; and
- determine that the action of the first hand matches a preset action, and project the virtual keyboard based on the key points of the first hand.

18. The apparatus according to claim 11, wherein the processing unit is further configured to:
- identify, based on the second image, that the finger of the second hand and the first hand are separated; and
- when the finger of the second hand and the first hand are separated, obtaining a third image by using the image capture unit.

19. The apparatus according to claim 11, wherein the apparatus further comprises a display unit; and the display unit is configured to display the first hand, the finger of the second hand, and the input text.

20. A non-transitory machine-readable medium having instructions stored therein, which when executed by a processor, cause the processor to perform operations, the operations comprising:
- obtaining key points of a first hand based on a first image comprising the first hand;
- projecting a virtual keyboard on the first hand based on the key points of the first hand;
- obtaining a second image comprising the first hand and a finger of a second hand;
- analyzing the second image using a preset neural network model trained to detect a contact state or a pressing state based on texture changes of the first hand, wherein the neural network model was trained with a training set comprising a plurality of first-type training images and a plurality of second-type training images, wherein the plurality of first-type training images comprise the finger of the second hand in a contact state or a pressing state and comprise labels of texture features of the first hand, and the plurality of second-type training images comprise the finger of the second hand separated from the first hand;
- in response to analyzing the second image using the preset neural network model, identifying, by the neural network model based on detecting a change in texture on the first hand, the contact state or the pressing state between the finger of the second hand and the first hand; and
- when the finger of the second hand and the first hand are in the contact state or the pressing state, determining input text based on a location at which the finger of the second hand touches or presses the first hand.

* * * * *